United States Patent Office.

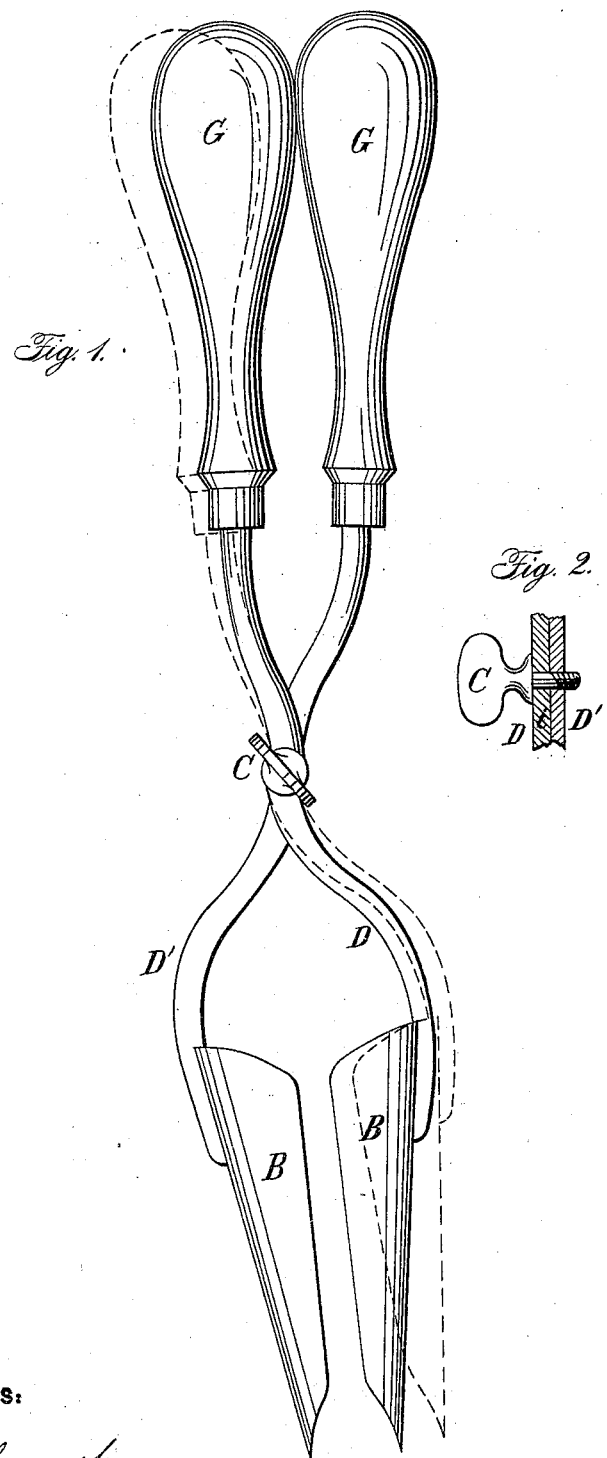

HIRAM CARMICHAEL, OF ROCHESTER, NEW YORK.

Letters Patent No. 71,133, dated November 19, 1867.

---

IMPROVEMENT IN TRANSPLANTERS FOR GARDEN USE.

---

The Schedule referred to in these Letters Patent and making part of the same.

---

TO ALL WHOM IT MAY CONCERN:

Be it known that I, HIRAM CARMICHAEL, of Rochester, in the county of Monroe, and State of New York, have invented a new and useful "Transplanter" for Garden Use; and I do hereby declare that the following is a full, clear, and exact description thereof, reference being had to the accompanying drawings, making part of this specification, in which—

Figure 1 is an elevation of my invention, it being represented by the full lines closed, and partially open by the dotted lines.

Figure 2 is a sectional view of the joint and joint-screw C.

Like letters indicate corresponding parts.

This invention consists in the construction of a device for transplanting garden roots and small plants without disturbing the earth about the roots, and therefore avoiding entirely the great liability heretofore experienced in the performance of this class of gardening, of killing the plants, or the almost certain effect of checking or retarding their growth.

To enable others to make and use my invention, I will describe its construction and operation.

I make two steel blades B, and shape them very much like the ordinary garden-trowel, except that I prefer them considerably more curved transversely. The blades are riveted or otherwise attached to the shanks D and D', which may be made of malleable iron, and shaped about as shown in fig. 1, being flattened at the point of intersection or where they cross. They are pivoted together by means of the screw C. That portion of the screw-stem which works in the shank D is not threaded, as shown in fig. 2. The screw is permanently attached to the shank D by means of the pin $i$, shown in fig. 2, so as to admit of the separation of the shanks by turning the screw out of the shank D', and at the same time prevent it from becoming detached and lost. By providing for the detachment or separation of the two blades, they may be used singly as an ordinary weeding or garden-trowel. Instead of the wooden handles G, the shanks D and D' may be cast with a thin oval-shaped handle upon them if desired. When the instrument is used for transplanting, it is opened more or less, as indicated by the dotted lines, and inserted in the ground where the plant or root is to be placed, deep enough to make a hole to receive the plant, and that earth is removed by closing the blades B upon the dirt between them and lifting it out. The plant is then similarly removed from its position, and placed in the hole prepared for it. The transplanter is then removed by spreading the blades to release the earth, &c., and the plant is then left in its new position without receiving the slightest shock or disturbance in growth, even if performed at mid-day in the sun, if carefully manipulated, as I have learned by actual and repeated experiment. If the earth is very mellow into which the plants are being transplanted, it will scarcely be necessary to make the hole by removing any portion of the earth, as the blades might probably be spread sufficiently without. The instrument may be made of different sizes, and the large ones may have an offset in the shanks sidewise, so as to allow the stem of large plants to pass up by the side of the shanks or handles.

What I claim as my invention, and desire to secure by Letters Patent, is—

As an improvement in transplanters, making the two blades B detachable by means of the screw-joint, substantially in the manner shown and described, whereby either blade may be used as a garden-trowel.

HIRAM CARMICHAEL.

Witnesses:
WM. S. LOUGHBOROUGH,
P. J. TURNER.